Aug. 19, 1952     G. R. PETERSON     2,607,275
RANGE FINDER ADAPTER
Filed Nov. 28, 1947
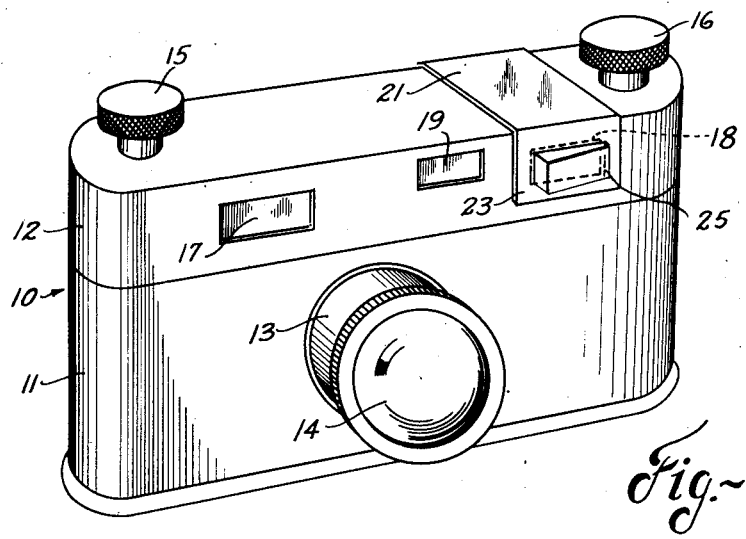
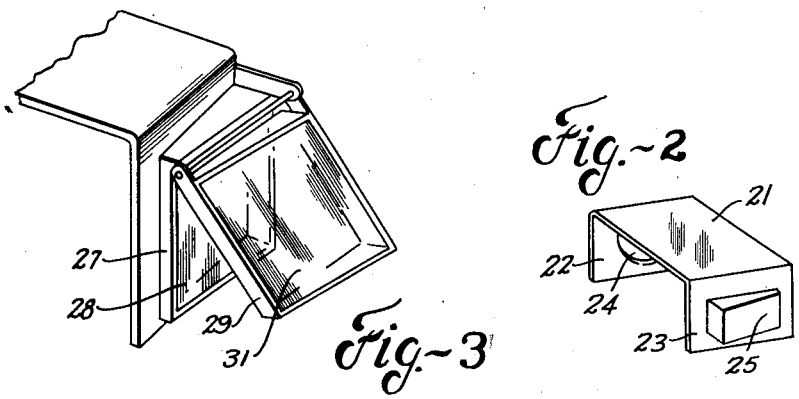
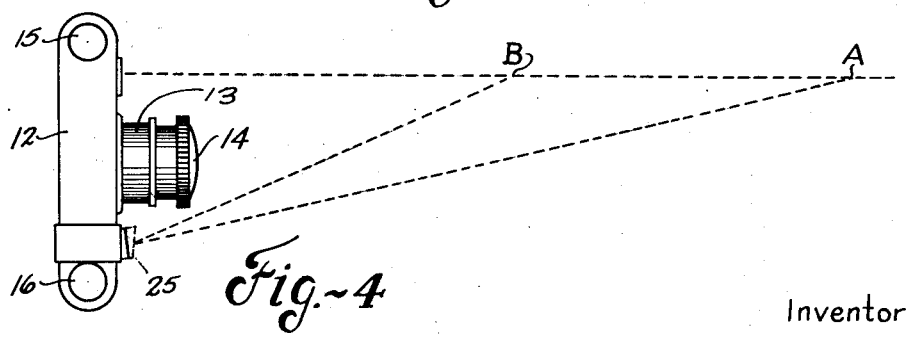
Inventor
*GLEN ROBERT PETERSON*
Tom Walker
Attorney Patented Aug. 19, 1952

2,607,275

UNITED STATES PATENT OFFICE 2,607,275

RANGE FINDER ADAPTER

Glen Robert Peterson, Forest Hills, N. Y.

Application November 28, 1947, Serial No. 788,539

1 Claim. (Cl. 95—44)

This invention relates to photographic equipment, and more particularly to a rangefinder adapter which may be attached to a camera in conjunction with the mounting thereon of special lenses.

Cameras of the class to which this invention relates are equipped with built-in rangefinder apparatus whereby the user may view the object to be photographed and adjust the apparatus to obtain a reading in feet or meters of the distance of the object from the camera. Visual indication, such as the split image or like device, is used in determining the range. When the range reading has been obtained, the lens may be positioned in accordance therewith, although in some cameras the lens is extended or retracted simultaneously with and in response to adjustment of the rangefinder apparatus. The rangefinder apparatus bears a fixed relation in its scope to the focal range of the lens supplied with the camera. This lens is often supplemented by special lenses for close-up work, as for copying and for portraits, which combination of lenses have a range not conforming to the scope of the rangefinder mechanism.

Accordingly, it has not been possible heretofore to make use of the rangefinder mechanism of a camera when working with supplementary lenses. Such difficulty is completely eliminated by use of adapters embodying the present invention.

The primary object of the invention is to provide adapters for camera rangefinding mechanisms having the aforementioned advantageous features, which may be economically manufactured for use in conjunction with different cameras and lenses.

Another object of the invention is to enable the rangefinder apparatus of a camera to be adapted for special uses by applying to the exterior of the camera a simple and inexpensive adapter.

A further object of the invention is to obtain a rangefinder adapter which may be clipped or otherwise removably fastened to a camera and which will present in front of a sighting window a glass prism for foreshortening the line of vision.

Still another object is to obtain a rangefinder adapter which may be variably formed for use in varying types of cameras, and which in one form may superimpose one prism upon another for selective use thereof.

A further object of the invention is to provide a rangefinder adapter embodying the advantageous structural features, the inherent meritorious characteristics and the mode of operation herein set forth, or their equivalents.

With the above primary and other incidental objects in view as will more fully appear in the specification, the invention intended to be protected by Letters Patent consists of the features of construction, the parts and combinations thereof and the mode of operation, as hereinafter described or illustrated in the accompanying drawings, or their equivalents.

In the accompanying drawing, wherein is shown the preferred but obviously not necessarily the only form of embodiment of the invention:

Fig. 1 is a view in perspective of a camera equipped with a rangefinder adapter according to one form of the invention;

Fig. 2 is a detail view in perspective of the rangefinder adapter of Fig. 1;

Fig. 3 is a fragmentary view in perspective of a rangefinder adapter according to a second form of the invention; and Fig. 4 is a schematic view of a camera equipped with a rangefinder adapter according to the present invention, showing by means of dotted lines how the adapter functions to shift the scope of the rangefinder apparatus.

Like parts are indicated by similar characters of reference throughout the several views.

Referring to the drawings, in Fig. 1 is shown a commercially known camera comprising a casing 10 made up of interconnected sections 11 and 12. Extending through the front of the casing section 11 is a telescopic mounting 13 for a lens 14. The section 12 contains the rangefinder mechanism and objective viewer. The knobs 15 and 16 projecting therefrom permit adjustment of the film.

In the front of the section 12 are a pair of spaced openings containing rangefinder windows 17 and 18. A third window 19, between the windows 17 and 18, is used in conjunction with or alternatively to the rangefinder windows for objective sighting.

According to the well-known construction and manner of use of the camera of Fig. 1, the rangefinder mechanism further includes an eye opening in the opposite or rear face of section 12, and adjustable mirror mechanism within the casing for directing the vision of the viewer through the windows 17 and 18. The windows 17 and 18 are fixed and preformed in a determined relation to the focal length of the lens 14 with which the camera is ordinarily equipped. Thus, within the range of the camera lens, the mirror mechanism of the rangefinder apparatus may be adjusted for an accurate reading of the range and the lens mounting 13 thereupon be retracted or extended to conform to such reading.

In adapting the camera for close-up work, for example copying or portraits, the conventional lens assembly is supplemented by a special lens, the pair of lenses having together a focal range inside the inner limit of the field of use of the rangefinding apparatus. To adapt the rangefinder apparatus for use with such special lenses there is provided an accesory for shortening the intersection of sight through the windows 17 and 18.

According to one form of the invention, such accessory comprises a spring clip which may be variably shaped and arranged to conform to the varying camera constructions. In the clip form shown in Figs. 1 and 2, the accessory or adapter comprises a strip of spring metal 21 having turned over end portions 22 and 23. The clip is attachable to the top of the casing section 12, with the end portions 22 and 23 respectively embracing the rear and front of the section.

In use the clip is positioned with end portion 22 thereof covering the rangefinder eye opening at the rear of the camera and with end portion 23 covering window 18 at the front of the camera. Within end portion 22 is an opening 24 for registry with the eye opening, while within end portion 23, in registry with window 18, is a wedge shaped prism 25. The prism 25, as shown in Fig. 4, foreshortens the line of sight through the window 18 so as to move the area of intersection with the line of sight through window 17 from point A to point B.

A rangefinder adapter according to the invention may assume other forms than as shown in Figs. 1 and 2. In Fig. 3, for example, is illustrated a clip 26 which may be similar to the clip 21, but which mounts on the front end 23 thereof a frame 27 holding a prism 28. The frame 27 in turn provides a hinged mounting for a second frame 29 holding a prism 31. The frame 29 may be swung to positions in front of prism 28 or out of line therewith in order that the rangefinder apparatus may be selectively adapted for use in a variety of focal ranges.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

Having thus described my invention, I claim:

In a camera having rangefinder apparatus including spaced apart sight windows constructed and arranged for a sight range conforming to the focal length of the camera lens, an adapter for shortening said sight range to correspond to the shorter focal length of attachable portrait lenses or the like, comprising a clip constructed and arranged for detachable mounting upon the camera, said clip comprising an elongated portion for engagement with the upper end of the camera and turned over end portions, one of said turned over end portions having an opening therein, prisms mounted on said turned over end portions in alignment with said opening, said prisms being mounted in superimposed relation one upon another for cooperation with said sight opening for foreshortening the intersection of sight through said windows, and a hinged mounting for the outer prism permitting said prism to be moved selectively into and out of effective position.

GLEN ROBERT PETERSON.

REFERENCES CITED

The following references are of record in the file of this patent:

UNITED STATES PATENTS

| Number | Name | Date |
| --- | --- | --- |
| 783,665 | Avril | Feb. 28, 1905 |
| 1,675,555 | Howell | July 3, 1928 |
| 1,854,665 | Parker | Apr. 19, 1932 |
| 1,930,432 | Barnack | Oct. 10, 1933 |
| 2,041,633 | Barnack | May 19, 1936 |
| 2,186,206 | Posner | Jan. 9, 1940 |
| 2,310,307 | Montgomery | Feb. 9, 1943 |
| 2,327,859 | Bolsey | Aug. 24, 1943 |
| 2,369,761 | Stegeman | Feb. 20, 1945 |

FOREIGN PATENTS

| Number | Country | Date |
| --- | --- | --- |
| 509,424 | Great Britain | July 14, 1939 |
| 849,485 | France | Aug. 21, 1939 |